United States Patent [19]

Ellenberger et al.

[11] Patent Number: 5,042,631
[45] Date of Patent: Aug. 27, 1991

[54] ELECTROPNEUMATIC CLUTCH CONTROL DEVICE

[75] Inventors: Gerard Ellenberger, Mornant; Gilles Massard, Caluire, both of France

[73] Assignee: Renault Vehicules Industriels, Lyons, France

[21] Appl. No.: 452,585

[22] Filed: Dec. 19, 1989

[30] Foreign Application Priority Data

Dec. 20, 1988 [FR] France ................................. 88 16793

[51] Int. Cl.⁵ ....................... F16D 25/08; F16D 25/14
[52] U.S. Cl. .................. 192/85 C; 192/91 R; 192/109 F
[58] Field of Search ..................... 192/52, 85 C, 91 R, 192/109 F

[56] References Cited

U.S. PATENT DOCUMENTS

| 3,171,526 | 3/1965 | Waclawek | 192/85 C X |
| 3,946,760 | 3/1976 | Murakami et al. | 192/109 F X |
| 4,086,992 | 5/1978 | Hamada et al. | 192/91 R X |
| 4,289,221 | 9/1981 | Chambers et al. | 192/109 F X |
| 4,796,739 | 1/1989 | Jonner et al. | 192/85 C X |
| 4,860,868 | 8/1989 | Murakami | 192/109 F X |
| 4,926,994 | 5/1990 | Koshizawa et al. | 192/85 C X |

FOREIGN PATENT DOCUMENTS

| 0256634 | 3/1988 | European Pat. Off. | |
| 3545500 | 7/1987 | Fed. Rep. of Germany. | |
| 0060334 | 4/1985 | Japan | 192/85 C |
| 60-234128 | 11/1985 | Japan. | |
| 0013831 | 1/1987 | Japan | 192/91 R |
| 2080909 | 2/1982 | United Kingdom. | |
| 2165914 | 4/1986 | United Kingdom. | |

Primary Examiner—Rodney H. Bonck
Attorney, Agent, or Firm—Oblon, Spivak, McClelland, Maier & Neustadt

[57] ABSTRACT

A pneumatic control device for a vehicle clutch has at least one clutch disk and includes a pneumatic cylinder operatively connected to the clutch disk operating the clutch disk as a function of pneumatic pressure applied to the cylinder. A displacement sensor measures an amount of travel of the clutch pedal and emits a signal based thereupon. An electronic package responsive to the signal from the displacement sensor outputs a control signal which follows a predetermined law as a function of the signal from the displacement sensor. A pneumatic circuit is connected to the pneumatic cylinder for supplying the pneumatic pressure thereto, the pneumatic circuit including an electropneumatic modulator which receives the control signal and outputs a pneumatic pressure as a function of the control signal.

4 Claims, 2 Drawing Sheets

ELECTROPNEUMATIC CLUTCH CONTROL DEVICE

BACKGROUND OF THE INVENTION

1. Field of the Invention

This invention relates to an electropneumatic clutch control device for motor vehicles, primarily industrial vehicles.

2. Description of the Background Art.

The most widely used system, mainly on light vehicles, is the unboosted control in which the clutch is connected to the pedal by a rod, cable or hydraulic linkage with emitter and receiver. On heavy trucks very frequently the control is boosted pneumatically supplemental to a mechanical or more generally a hydraulic linkage: this is the clutch servo.

These different systems have numerous drawbacks, particularly for pedal force, progressiveness and maintenance.

Force on the pedal represents a proportional mechanism control force, but it is increased during declutching or reduced during clutching by the sum of all the frictions from each of the components, which produces a significant declutching force and significant variation in force between declutching and clutching.

The clutch has three modes of use: when shifting gears, when starting up and when it is not operated.

When shifting gears, the clutch is operated all or nothing, and above all must ensure good disengagement between the engine and transmission so as not to damage the synchronizers. The mechanism is thus designed so that its control ensures "plate lift," by correct travel.

When starting up, the clutch is operated with "controlled torque extraction," i.e., to ensure progressive startup, the driver gauges pedal movement to "make it slip."

From then on it is felt that the more significant the slippage, the more progressive the clutching will be judged. In addition to the declutching or gear shifting phases, the clutch is not operated and its main role then is to transmit engine torque to the transmission (or reciprocally) with no ill-timed slippage. The clutch thus provides, when not operated, nominal preslippage torque, much greater than engine torque.

In short, the clutch mechanism control has three areas, each with its own function:

a travel corresponding to clutch "overcalibration,"

"slippage" travel useful in startups, and a "plate lift" travel which is needed for shifting gears.

The problem with present controls is, paradoxically, their excessive linearity. With a linear control, the same proportion of slippage travel is reproduced with the pedal as in total travel. Now, with the usual clutches, this proportion is rather small, which produces progressiveness that is not ideal unless the overall travel is increased, with the resulting loss of comfort.

Lastly, the known systems such as hydraulic linkage systems have the drawback of requiring constant maintenance and posing ticklish bleeding problems.

SUMMARY OF THE INVENTION

An object of the present invention is to propose an electropneumatic clutch control which is nonlinear, to increase progressiveness, while being adaptable to clutch mechanisms without requiring modifications.

According to an embodiment of the invention, the electropneumatic clutch control device has a foot control by use of a pedal and a clutch with at least one disc.

A pneumatic clutch control device for a vehicle clutch having at least one clutch disk includes a pneumatic cylinder operatively connected to the clutch disk for operating the clutch disk as a function of a pneumatic pressure applied to the cylinder. A displacement sensor for measuring an amount of travel of the clutch pedal emits a signal based thereupon. An electronic package responsive to the signal from the displacement sensor outputs a control signal which follows a predetermined law as a function of the signal from the displacement sensor. A pneumatic circuit is connected to the pneumatic cylinder for supplying pneumatic pressure thereto, the pneumatic circuit including an electromagnetic modulator which receives the control signal and outputs a pneumatic pressure as a function of the control signal.

The electropneumatic clutch device according to the invention thus offers the advantage of being smoother because it has a slight hysterisis in force. Further, it is not linear which improves progressiveness, and it does not require maintenance. Finally, it can be adapted without difficulty to clutch mechanisms which do not have to be modified.

BRIEF DESCRIPTION OF THE DRAWINGS

Other characteristics and advantages of this invention will be brought out from the description which follows the embodiment given as an example in reference to the accompanying drawings in which.

DESCRIPTION OF THE PREFERRED EMBODIMENTS

Figure 1:
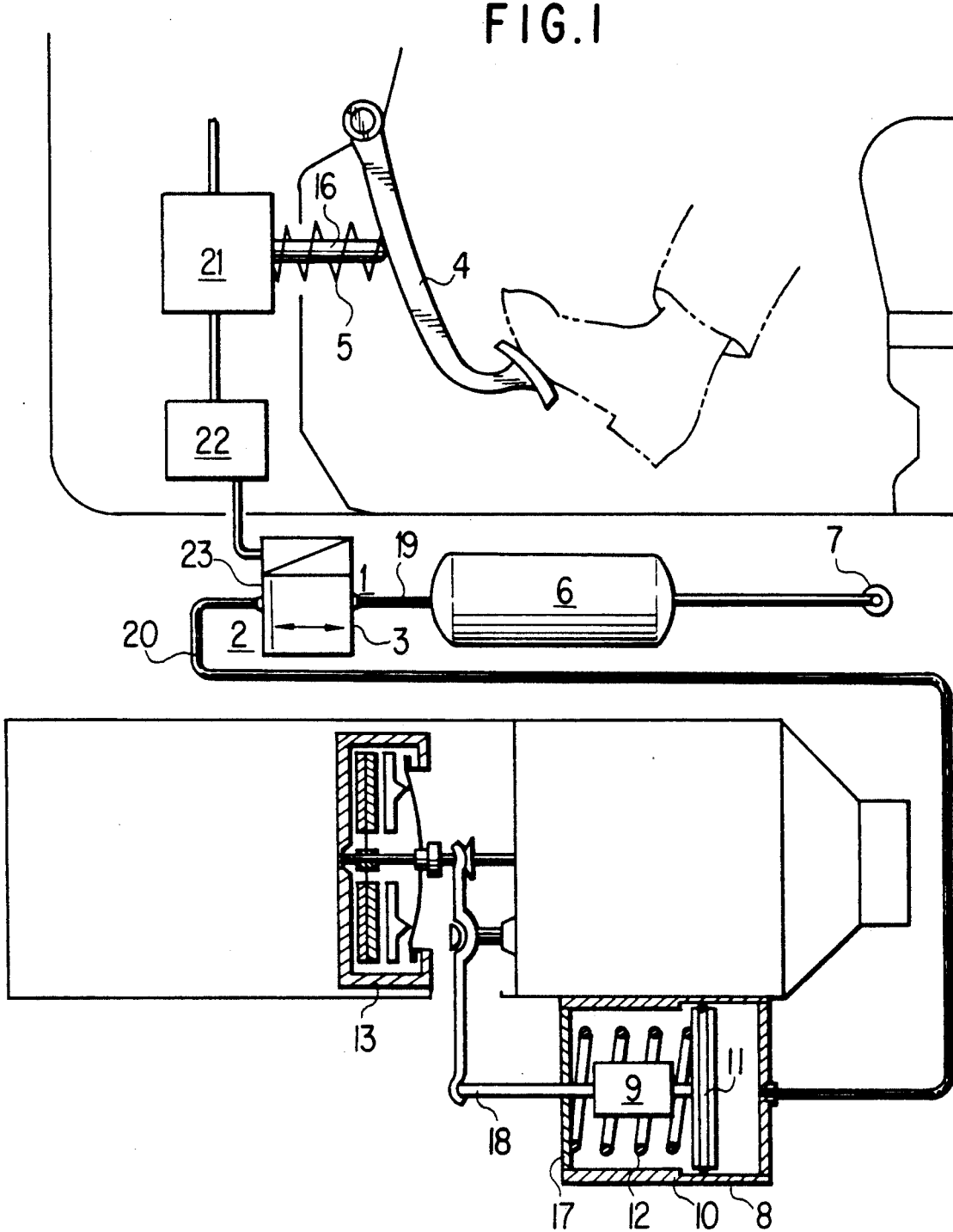
FIG. 1 is an overall view of the pneumatic clutch control device according to the invention.

The electropneumatic clutch control device has a foot control by pedal 4, sensor 21, electronic package 22, electropneumatic modulator 23, pneumatic cylinder 8, clutch mechanism 13 and pneumatic circuit. The pneumatic circuit has a tank 6 connected by connection 7 to the compressed air source.

Displacement sensor 21 measures the travel of clutch pedal 4 and is installed for said pedal 4 with which it cooperates by pusher 16 and an elastic system 5 of the return spring type. The electronic package 22 shapes the signal emitted by the sensor 21 and emits a signal to electropneumatic modulator 23. The electropneumatic modulator 23 delivers, within pneumatic cylinder 8, a pressure conforming to the signal emitted by electronic package 22.

The pneumatic actuator, which is cylinder 8, is installed on the clutch housing and acts on clutch stop 13 due to the above mentioned internal control.

The pneumatic circuit comprises a supply supply duct 19, supply duct 20 and orifice 3 of modulator 23. Supply duct 19 of modulator 23 is connected to tank 6 and opens into intake orifice 1. Supply duct 20 of cylinder 8 opens into output orifice 2 in the body of the modulator 23, thus connecting it to modulator 23.

For the engaged position, i.e., when pedal 4 is out, supply duct 20 of cylinder 8 is put in communication with venting orifice 3 by a value element (not shown) of the modulator 23.

During movement of clutch pedal 4, modulator 23 is set to establish communication between supply duct 19 of modulator 23 and supply duct 20 of cylinder 8 to obtain development of supply pressure in cylinder 8 which follows a predetermined law as a function of the control signal from the package 22, which is in turn a function of the travel d of pedal 4.

This pressure P acts on cylinder 8 which functions to obtain a displacement of clutch mechanism 13 which follows a predetermined course as a function of said pressure. Thus, according to the invention, pressure P is the variable which controls clutch travel.

Figure 2:
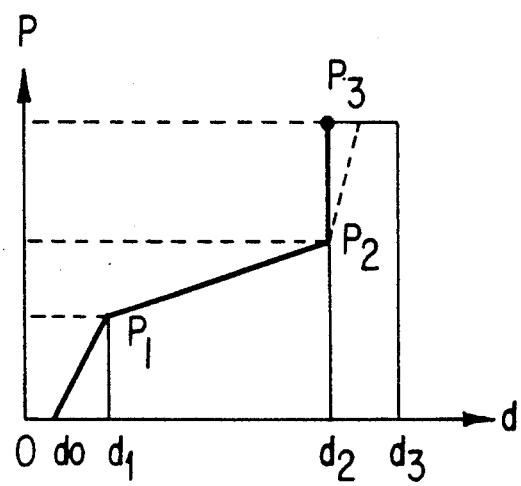
FIG. 2 is a pressure development curve as a function of the clutch pedal movement.

The curve representing the law of development of supply pressure P applied to cylinder 8 as a function of travel d of pedal 4 comprises (FIG. 2):

a first phase with steep slope up to P1 during a slight displacement of pedal 4 from d0 to d1 which corresponds to the overcalibration, a second phase of slight slope from P1 to P2 during a greater displacement of pedal 4 from d1 to d2 which corresponds to slippage, a third phase of very steep slope from P2 to P3 during an extremely slight displacement near d2 until the pressure reaches the maximum pressure selected for declutching, a fourth phase of zero slope during a slight displacement from d2 to d3.

In order to achieve these four phases, displacement sensor 21 has a linear characteristic and electronic package 22 emits a control signal to electropneumatic modulator 23 which evolves in four areas:

a first area of values with steep slopes corresponding to the first phase, a second area of values with slight slope corresponding to the second phase, a third area of values with very steep slopes corresponding to the third phase, a fourth area of value with infinite slope corresponding to the fourth phase.

The curve representing the law of development of displacement of clutch mechanism 13 as a function of pressure P is a linear increasing function in the first phase which corresponds to overcalibration, slippage and plate lifting, and is then at zero slope which corresponds to the stop position of the pneumatic cylinder 8 piston.

Displacement of the clutch mechanism as a function of pressure P, according to the predetermined law described above, is obtained thanks to pneumatic cylinder 8. Cylinder 8 comprises a piston 11 acted on by compressed air regulated by modulator 23. An elastic system 12 opposes the compressed air action and is located between piston 11 and bottom 17 of the the cylinder. The role of the elastic system is to determine the linear, increasing law mentioned above as a function of the resistant force of the clutch. Stop 10 limits the travel of piston 11 and rod 18, which is the connecting system which makes it possible to displace clutch mechanism 13. A conventional system 9 for automatic compensation of the clutch wear travel provides the connection between rod 18 and piston 11. This connection is rigid when compressed air acts on piston 11 and is sliding when cylinder 8 is no longer supplied with compressed air, i.e., in an engaged position of clutch 13 corresponding to the out position of pedal 4.

Electropneumatic modulator 23 is proportional and when it is supplied with compressed air, it delivers pressure at its output proportional to the electrical set point signal. This characteristic will preferably be linear.

Electronic package 22 is used to adapt the power of the signal emitted by sensor 21 to that required by modulator 23. It is also used to convert the signal emitted into a signal compatible with that controlling the modulator. It makes the signal emitted by sensor 21 nonlinear to act on control progressiveness.

We claim:

1. A pneumatic clutch control device for a vehicle clutch having at least one clutch disk, comprising:

a pneumatic cylinder operatively connected to said clutch disk for operating said clutch disk as a function of a pneumatic pressure applied to said cylinder;

a displacement sensor for measuring an amount of travel of a clutch pedal, and emitting a signal based thereon;

electronic package means responsive to said signal from said displacement sensor for outputting a control signal which follows a predetermined law as a function of said signal from said displacement sensor; and a pneumatic circuit connected to said pneumatic cylinder for supplying the pneumatic pressure thereto, said pneumatic circuit including an electropneumatic modulator which receives said control signal and outputs a pneumatic pressure as a function of said control signal, wherein said electronic package means comprises means such that said pneumatic pressure comprises:

a) a first phase having a sharp slope of pneumatic pressure change for an initial pedal movement which corresponds to a clutch overadjustment;

b) a second phase having a shallow slope of pneumatic pressure change for a pedal movement which corresponds to slippage of the clutch;

c) a third phase having a substantially vertical slope of pneumatic pressure change for a pedal movement after slippage, until the pneumatic pressure is sufficient to completely actuate the clutch; and d) a fourth phase of zero slope of pneumatic pressure change for any further pedal movement, wherein said electropneumatic modulator comprises:

e) a body having an intake orifice connected to a source of pneumatic pressure, an output orifice connected to said pneumatic cylinder and a venting orifice, and f) means responsive to said control signal for selectively connecting said output orifice with one of said intake orifice and said venting orifice so as to selectively control the pneumatic pressure applied to said cylinder, and wherein said electropneumatic modulator comprises means such that said output orifice and said cylinder are connected to said venting orifice when said pedal is at rest and wherein said cylinder comprises means for operating said clutch disk as a linear function of said first through third phases of said pneumatic pressure.

2. The device of claim 1 wherein said electronic package means comprises means such that said control signal comprises:

a first zone of high force corresponding to said first phase of pneumatic pressure;

a second zone having a low force corresponding to said second phase of pneumatic pressure;

a third zone of very high force corresponding to said fourth phase of pneumatic pressure.

3. The device of claim 1 wherein said modulator outputs said pneumatic pressure as linear function of said control signal.

4. The control device of claim 1, wherein said pneumatic cylinder comprises:

a piston on which said pneumatic pressure acts;
an opposing elastic system located between said piston and a bottom of said cylinder;
a stop for limiting the travel of said piston;
a rod connecting said piston to said clutch disk;
a means between said rod and said piston for automatically adjusting for wear of the clutch.

* * * * *